US006217442B1

(12) United States Patent
Schmidt

(10) Patent No.: US 6,217,442 B1
(45) Date of Patent: Apr. 17, 2001

(54) GRAIN PROCESSING APPARATUS AND METHODS

(76) Inventor: Arnold Schmidt, Box 99, Maple Creek, Saskatchewan (CA), S0N 1N0

( * ) Notice: Subject to any disclaimer, the term of this patent is extended or adjusted under 35 U.S.C. 154(b) by 0 days.

(21) Appl. No.: 09/292,335

(22) Filed: Apr. 15, 1999

(30) Foreign Application Priority Data

Feb. 24, 1998 (CA) .................................................. 2230363

(51) Int. Cl.[7] .............................. A01F 12/44; B07B 1/00

(52) U.S. Cl. ............................ 460/79; 56/14.6; 241/172; 241/7; 241/9; 241/79.1

(58) Field of Search ............................ 460/79, 118, 114, 460/111; 56/14.6; 241/53, 54, 58, 79.1, 73, 186.5, 7, 9, 19, 24.1

(56) References Cited

U.S. PATENT DOCUMENTS

| | | | | |
|---|---|---|---|---|
| 2,670,138 | * | 2/1954 | King et al. | 241/53 |
| 2,699,293 | * | 1/1955 | Svendsen | 241/53 |
| 3,594,848 | * | 7/1971 | Arkinson | 15/314 |
| 3,595,290 | * | 7/1971 | Tassev | 146/123 |
| 3,703,200 | * | 11/1972 | Palyi et al. | 99/233.8 |
| 3,734,752 | * | 5/1973 | Headley | 99/233.3 |
| 3,920,116 | * | 11/1975 | Butler | 198/128 |
| 3,960,068 | * | 6/1976 | Salete | 99/606 |
| 4,017,034 | * | 4/1977 | Griffith et al. | 241/74 |
| 4,111,493 | * | 9/1978 | Sperber | 302/42 |
| 4,203,555 | * | 5/1980 | Dickson, Jr. | 241/15 |
| 4,222,864 | * | 9/1980 | Keller | 209/284 |
| 4,231,495 | * | 11/1980 | Lund | 222/345 |
| 4,294,692 | * | 10/1981 | Keller | 209/300 |
| 4,310,004 | * | 1/1982 | De Busscher et al. | 130/27 |
| 4,344,723 | * | 8/1982 | Ellingson | 406/53 |
| 4,422,578 | * | 12/1983 | Scott | 241/6 |
| 4,463,022 | * | 7/1984 | Sterner et al. | 426/262 |
| 4,703,896 | * | 11/1987 | Fábián et al. | 241/172 |
| 4,776,522 | * | 10/1988 | Hoffman | 241/36 |
| 5,115,984 | * | 5/1992 | Satake | 241/7 |
| 5,145,117 | * | 9/1992 | Satake et al. | 241/8 |
| 5,211,343 | * | 5/1993 | Wellman | 241/86.1 |
| 5,238,196 | * | 8/1993 | Chang | 241/56 |
| 5,242,122 | * | 9/1993 | Bogen | 241/30 |
| 5,381,968 | * | 1/1995 | Lohnherr et al. | 241/19 |
| 5,564,636 | * | 10/1996 | Mock et al. | 241/261.2 |
| 5,673,862 | * | 10/1997 | Wingler | 241/81 |
| 6,082,934 | * | 7/2000 | Reinsch et al. | 406/38 |

* cited by examiner

*Primary Examiner*—Thomas B. Will
*Assistant Examiner*—Arpad Fabian Kovacs
(74) *Attorney, Agent, or Firm*—Adrian D. Battison

(57) ABSTRACT

A grain processing apparatus is used in one embodiment for debranning grain to remove the bran. In another embodiment, it is used as a mill for milling flour. The processor includes a cylindrical drum with an internal rotor having a set of impeller rods. The grain is loaded into the drum and is withdrawn as debranned kernels or flour as treatment proceeds. Bran removed from the grain is withdrawn through a vacuum discharge at the top of the apparatus. The grain is either discharged through a grain discharge or, where it is to be milled, it is withdrawn through the vacuum discharge as flour. The relatively coarse bran can be separated from the flour using a sifter. The air flow withdrawing the flour from the drum is drawn into the drum at the bottom, through a venturi and a valving arrangement. This cools the inlet air and maintains the temperature of the drum at an acceptable temperature.

30 Claims, 4 Drawing Sheets

GRAIN PROCESSING APPARATUS AND METHODS

FIELD OF THE INVENTION

The present invention relates the processing of grain.

BACKGROUND OF THE INVENTION

Conventional roller mills require large spaces and skilled manpower to maintain operation. To make white flour grain is rolled and sifted, rolled and sifted in many steps to yield the white flour. In the process, most of the 45 minerals, which are in the grain to start with are lost. When processing wheat multiple breaking and sifting procedures remove the bran and separate the remaining particles into different grades.

The present invention proposes a novel apparatus that may be used for either debranning or milling grain. The apparatus can be provided at a more modest cost than existing debranning machines, making the milling of white flour readily available for large and small millers.

SUMMARY OF THE INVENTION

According to one aspect of the invention there is provided a grain processor comprising:

- a substantially cylindrical drum oriented substantially horizontally;
- a rotor extending along the interior of the drum, said rotor comprising a plurality of radial impellers spaced around and spaced along the rotor;
- rotor drive means for rotating the rotor in the drum;
- grain inlet means for delivering grain to the drum;
- air inlet means for admitting air into the drum adjacent a bottom side of the drum;
- discharge means, including an opening in the drum at a top side thereof; and
- vacuum means for drawing a flow of air and solids suspended in the flow of air from the drum, through the discharge means.

In one embodiment, the apparatus is used as a debranner for removing bran from grain. The debranner includes a grain outlet at the outlet of the drum for withdrawing the hulled grain and the bran is drawn through a vacuum plenum.

In another embodiment, the apparatus is used as a flour mill. The inlet air is automatically cooled. For some grades of flour, for example the flour used for making the flatbread known as chapati or roti, the air supply can be restricted, increasing the dwell time in the mill. The flour is removed through the plenum at the vacuum outlet from the drum. The plenum may have one side offset to provide a widened section and a deflector opposite the offset to deflect grain entering the plenum back into of the drum.

According to another aspect of the present invention there is provided a method of processing grain, comprising:

- providing a drum;
- providing in the drum a rotor including a plurality of radiating impellers;
- introducing grain into the drum adjacent the inlet end;
- rotating the rotor to cause the impellers to stir the grain in the drum; and
- drawing a flow of air and grain particles suspended therein from the drum.

For debranning, the bran is withdrawn in the air flow and the debranned grain is removed from an outlet end of the drum. For milling, the vacuum system draws out the milled flour. The air flow carries out both flour and bran where the grain has not been debranned. The result is whole wheat flour.

For white flour, the debranner is used first first and then the mill.

Round rotor impellers are suitable for use with most grains and flour products. For semolina in some cases other cutters, for example the applicant's "Micronizers™" or knife heads may be used on the impellers.

The speed of the rotor and the dwell time of the grain in the drum have been found to be of importance in achieving the desired results. Exact parameters will depend on the mill size and configuration, and the grain being processed.

BRIEF DESCRIPTION OF THE DRAWINGS

In the accompanying drawings, which illustrate an exemplary embodiment of the present invention.

DETAILED DESCRIPTION

Figure 4:
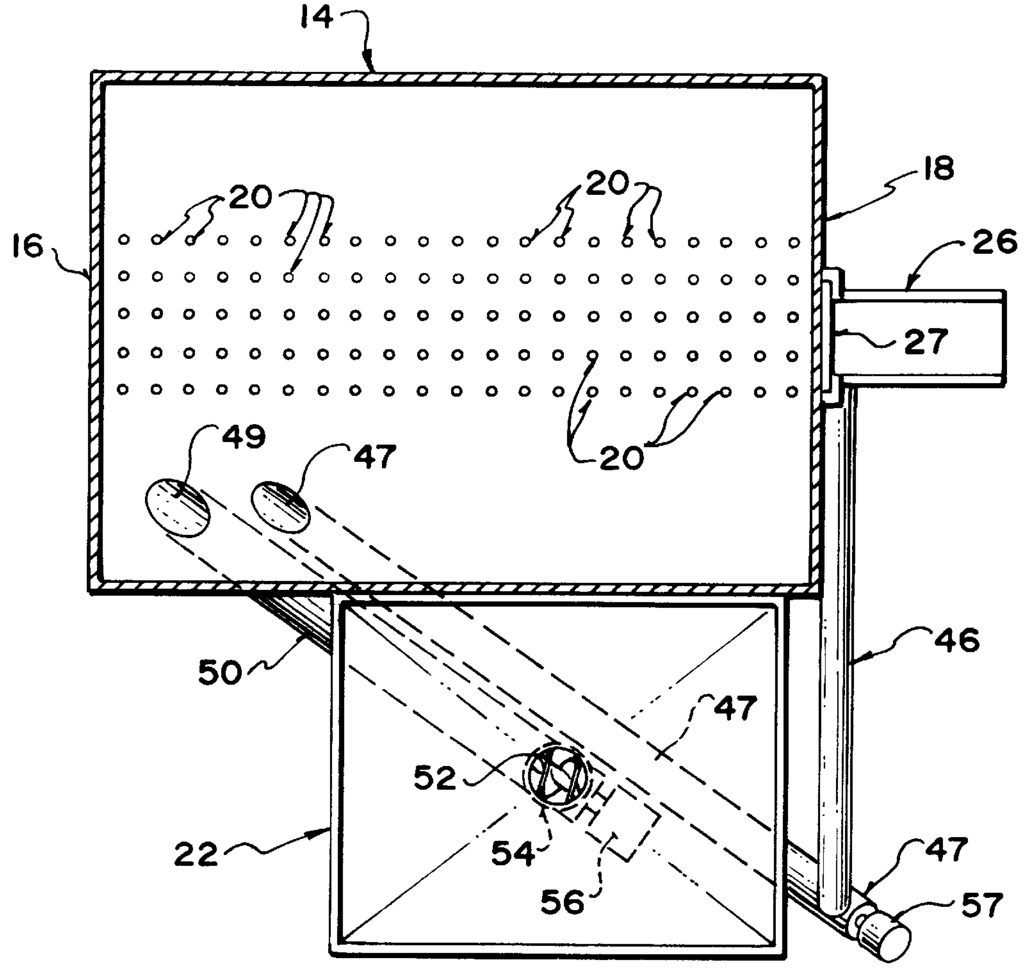
FIG. 4 is a cross-section along line 4—4 of FIG. 2.

Referring to the accompanying drawings, there is illustrated a mill 10. This includes a stand 12 supporting a horizontal cylindrical drum 14. The drum has an inlet end 16 and an outlet end 18. Five rows of air inlet openings 20 (FIG. 4) extend along the bottom of the drum for letting air into the drum interior. A grain hopper 22 is mounted at one side of the drum for holding grain to be processed. Along the top of the drum is a vacuum plenum 24 for withdrawing air and suspended solids from the drum. At the bottom of the outlet end is a grain outlet 26 for discharging processed grain in debranning applications. The outlet may be closed with a sliding gate 27.

Figure 1:
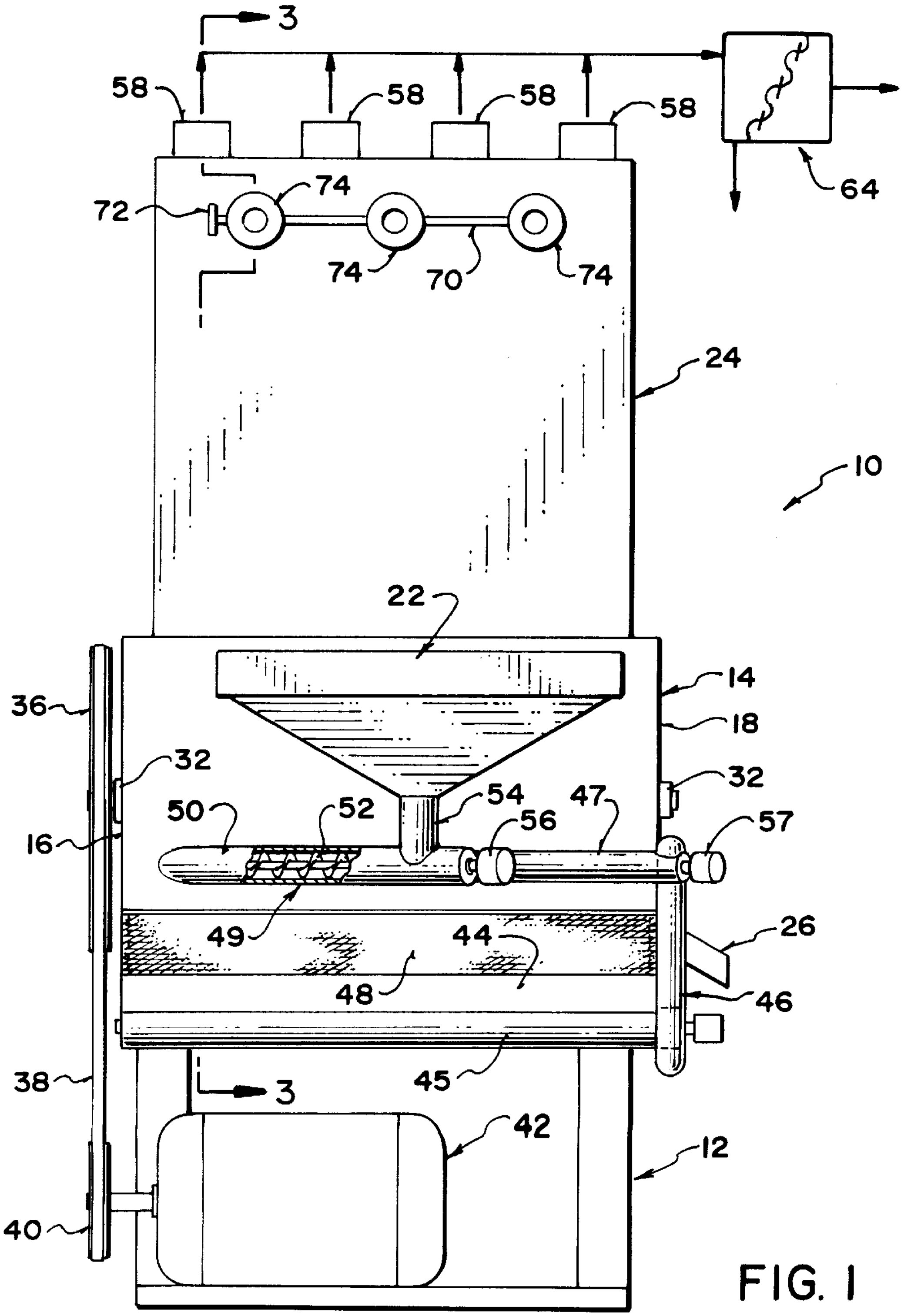
FIG. 1 is a side view of an apparatus according to the present invention.
Figure 2:
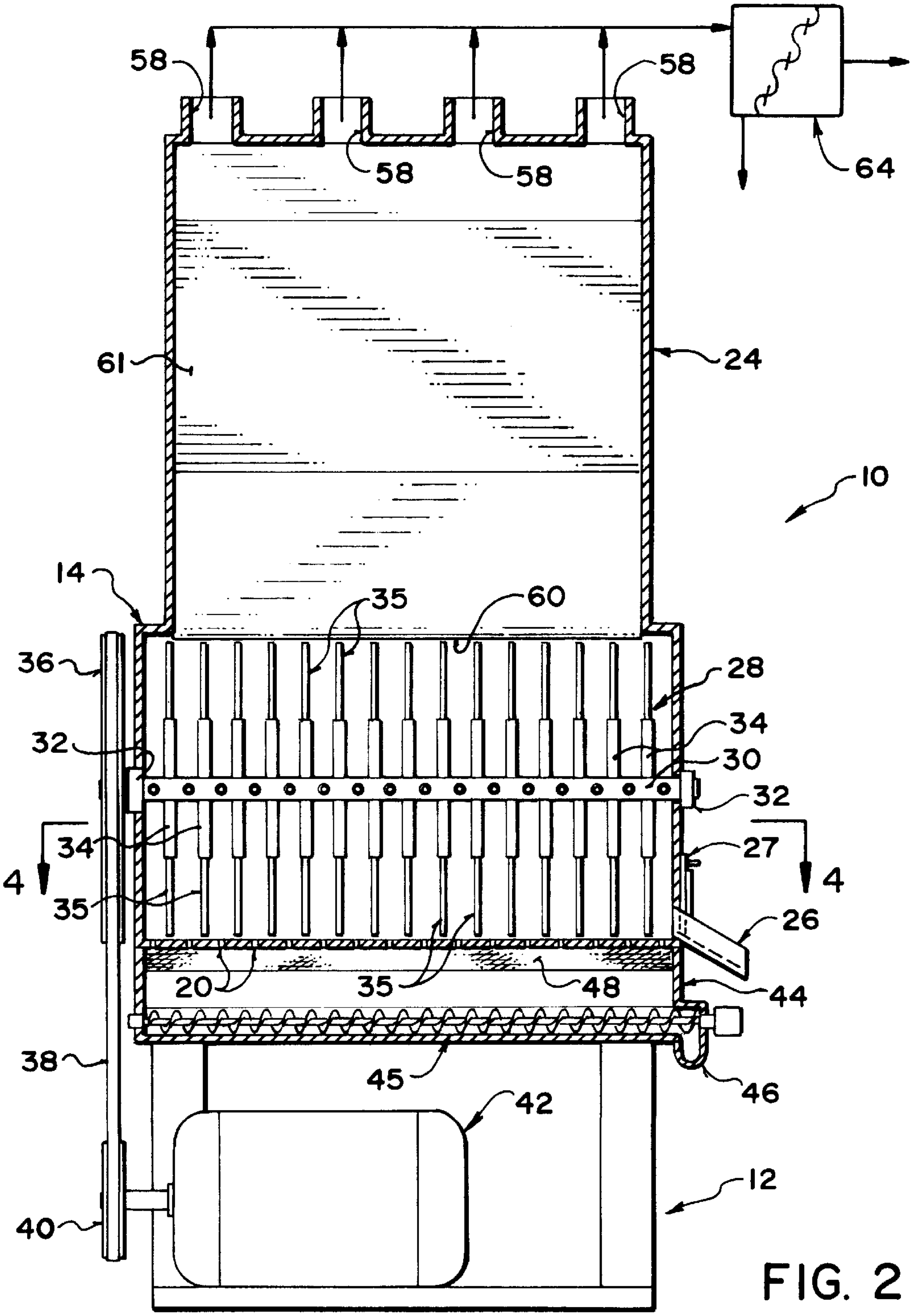
FIG. 2 is a longitudinal cross-section of the apparatus of FIG. 1.
Figure 3:
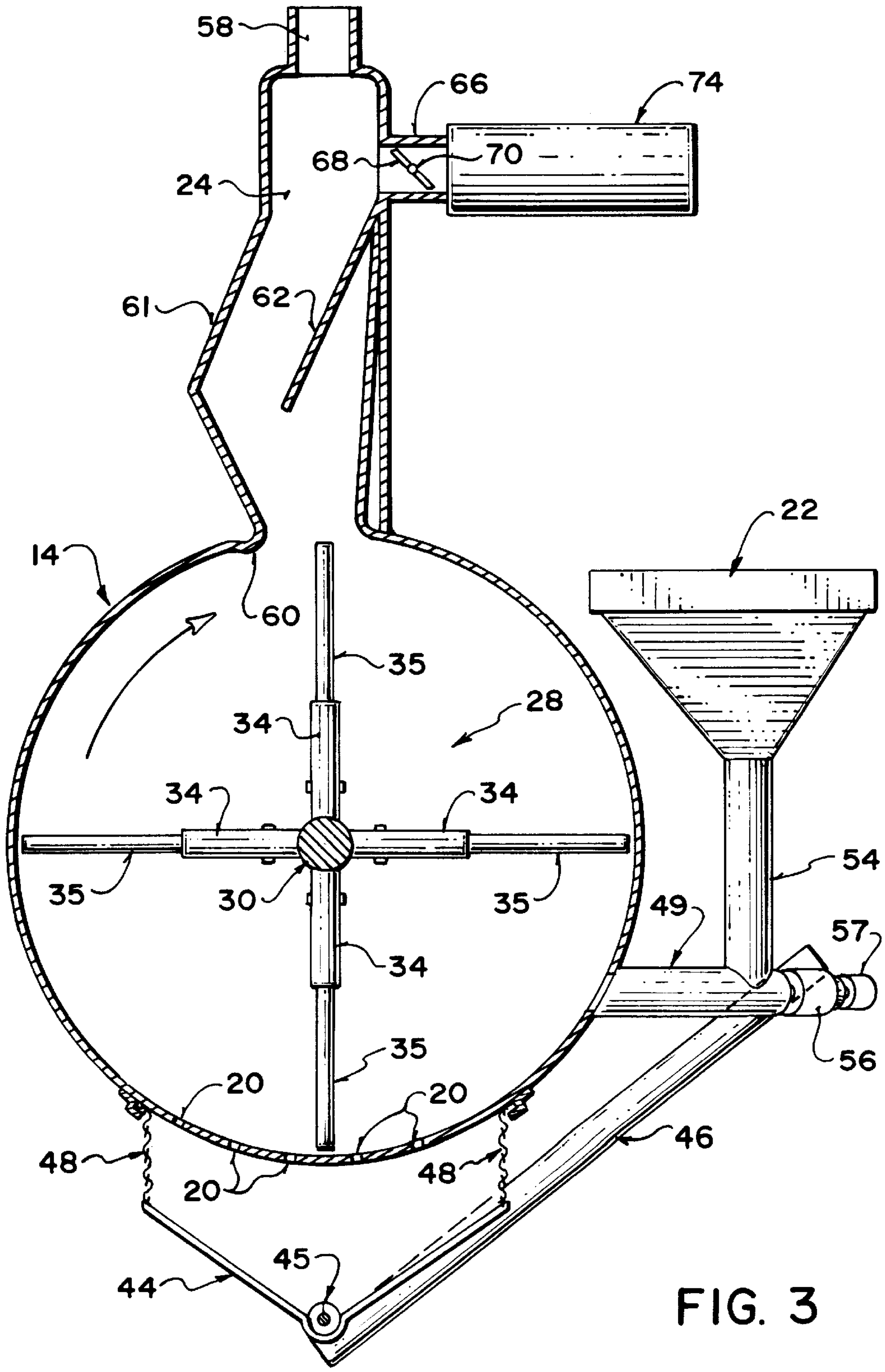
FIG. 3 is a cross-section along line 3–3 of FIG. 1.

With particular reference to FIGS. 2 and 3, the mill includes a rotor 28 extending along the center of the drum. The rotor includes an axial shaft 30 supported in bearings 32 at the ends of the drum. A set of impeller sockets 34 is mounted on the shaft. These sockets radiate from the shaft and are arranged in four orthogonal rows extending along the shaft. Impeller rods 35 are fixed in the respective sockets to sweep the interior of the drum as the rotor rotates.

At the inlet end of the apparatus, the shaft projects beyond the end of the drum and carries a pulley 36. This is connected through a belt 38 to a drive pulley 40 mounted on the drive shaft of an electric motor 42.

Below the air inlet openings 20, a hopper 44 extends the length of the drum to capture grain escaping through the air openings. An auger 45 along the bottom of the hopper delivers the collected grain to the outlet end of the drum, where it is elevated by an auger 46 to a third auger 47. Auger 47 opens into the bottom of the drum towards the inlet end and is inclined somewhat in the direction of rotation of the rotor. This returns the grain to the drum. The hopper 44 has screen side walls 48 to allow the inflow of air, while retaining grain and excluding the entrance of foreign matter.

Grain is delivered to the interior of the drum by an auger 49 including auger tube 50 opening into the bottom of the drum towards the inlet end and inclined somewhat in the direction of rotation of the rotor. This auger is generally parallel to the recycling auger 47. The auger tube 50 contains helical flighting 52 that retains a plug of grain in the auger tube to form an air lock preventing significant air inflow into the drum through the auger tube. The supply auger 49 is supplied with grain from the hopper 22 through a tube 54. Supply auger 49 is driven by a motor 56, while recycling auger 47 is driven by hydraulic motor 57.

The vacuum plenum 24 along the top of the mill includes a set of four vacuum ducts 58 along the top of the plenum. On the upstream side of the plenum, that is the side which the rotating impellers approach, is a deflector 60 that deviates from the cylindrical configuration of the drum and curves inwardly to deflect grain towards the center of the drum, away from the open bottom of the vacuum plenum. This assists in preventing grain kernels from being drawn from the drum with the fines from the process. Above the deflector, the adjacent side 61 of the plenum has a wide V-shape, widening the plenum so that air flow into the plenum will partially stagnate, allowing large suspended particles to drop from the suspension and also cooling the flow. A downwardly sloping deflector plate 62 on the opposite side of the plenum extends across the throat of the plenum to intercept any grain kernels that pass through the throat. A vacuum duct leads from the ducts 58 to a filter schematically illustrated at 64 for removing suspended solids from the air flowing from the outlet.

Near the top of the plenum are three air inlet ducts 66. These have valves 68 mounted on a common shaft 70 to control the air flow into the plenum 24, and therefore the pressure in the plenum. A single control 72 rotates the shaft 70. The ducts 68 are equipped with respective air filters 74.

To use the apparatus as a flour mill, grain is loaded into the hopper 22 for delivery to the interior of the drum using the auger 49. The auger delivers the grain into the apparatus towards the inlet end and at least partially in the direction of rotation. Vacuum is applied to the plenum 24 through the vacuum ducts 58 and the rotor is driven clockwise as seen from the inlet end. The dwell time is adjusted by controlling the vacuum applied to the fines outlet to allow the grain to remain in the drum for a time sufficient to be pulverized to a fine flour which is drawn out of the drum through the fines outlet. The bran that accompanies the flour as it is withdrawn is coarser than the flour particles and may be separated from the flour using a coarse screen in the filter 64.

Figure 5:
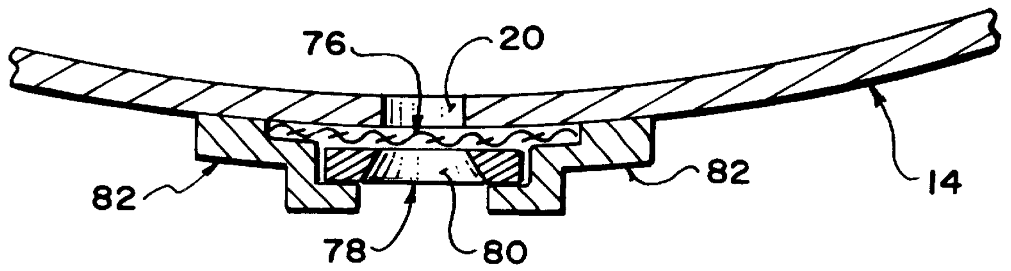
FIG. 5 is a detail showing an inlet screen that is useful for a debranning application.

To use the mill for debranning grain, a grain outlet 26 is provided at the bottom of the outlet end of the apparatus. As shown in FIG. 5, each row of air inlet openings 20 for the drum is covered with a screen 76 mounted on the outside of the drum to prevent grain particles from falling from the drum. Covering the screen is a valve plate 78 with a set of ports 80 that normally align with the respective inlet openings 20 in the row. The ports 80 are tapered conically for accelerating the air flow into the drum so that when the air flow enters the drum, its sudden expansion produces a significant temperature drop. Two brackets 82 mount each valve plate on the drum for sliding movement along the drum, allowing the inlet openings 20 to be opened or closed by movement of the valve plates.

In debranning, the rotor is driven more slowly than in a milling operation. The impellers agitate the grain to break up and separate the hull or bran from the seeds. The loose bran is relatively light weight and is easily suspended in the air flow through the grain, from the air inlets 20 to the vacuum plenum 24. The relatively coarse bran is separated from the air stream using a screen type filter. The air flow through the drum is of reduced temperature because of the venturi effect of the ports 46, thus keeping the process at a moderate temperature so that the nutrients in the grain are not degraded.

While one embodiment of the present invention has been described in the foregoing, it is to be understood that other embodiments are possible within the scope of the invention and are intended to be included herein. The invention is to be considered limited solely by the scope of the appended claims.

What is claimed is:

1. A grain processor comprising:

a substantially cylindrical drum oriented substantially horizontally;

a rotor extending along the interior of the drum, said rotor comprising a plurality of radial impellers spaced around and spaced along the rotor;

rotor drive means for rotating the rotor in the drum;

grain inlet means for delivering grain to the drum;

air inlet means for admitting air into the drum adjacent a bottom side of the drum;

discharge means, including an opening in the drum at a top side thereof; and vacuum means for drawing a flow of air and solids suspended in the flow of air from the drum, through the discharge means.

2. A grain processor according to claim 1 wherein the air inlet means comprise a plurality of holes opening into the bottom of the drum, the holes being distributed along the drum.

3. A grain processor according to claim 1 wherein the grain inlet means comprise means for delivering grain to the drum adjacent an inlet end of the drum.

4. A grain processor according to claim 3 wherein the air inlet means comprise a plurality of holes opening into the bottom of the drum, the holes being distributed along the drum.

5. A grain processor according to claim 1 wherein the grain inlet means include means for inhibiting a flow of air into the drum through the grain inlet means.

6. A processor according to claim 1 wherein the processor is a debranning mill for removing bran from grain, and including grain outlet means adjacent the outlet end of the drum for the removal of hulled grain from the drum.

7. A processor according to claim 1 wherein the processor is a debranning and milling apparatus and including screening means for screening bran from the flow of air drawn through the discharge means.

8. A processor according to claim 1 wherein the grain inlet means comprise an auger for delivering grain into the rum.

9. A processor according to claim 3 wherein the grain inlet means comprises means for delivering grain into the bottom of the drum in a direction towards the inlet end of the drum.

10. A processor according to claim 1 wherein the grain inlet means delivers grain into the bottom of the drum at least partially in the direction of the rotation of the impeller elements.

11. A processor according to claim 1 wherein the air inlet means includes venturi means for accelerating air flow into the drum.

12. A processor according to claim 1 wherein the air inlet means includes valve means for restricting air flow into the drum.

13. A processor according to claim 1 wherein the vacuum means comprise a plenum at the top of the drum and a vacuum tube leading from the plenum.

14. A processor according to claim 13 including deflector means projecting from the side of the drum adjacent the plenum for deflecting grain away from the plenum.

15. A method of processing grain, comprising:

providing a drum having an inlet end;

orienting the drum substantially horizontally;

providing in the drum a rotor having a substantially horizontal rotor axis extending along the drum and including a plurality of impellers projecting radially from the rotor axis to adjacent the drum;

introducing grain into the drum adjacent the inlet end;

rotating the rotor to cause the impellers to stir the grain in the drum; and drawing a flow of air and grain particles suspended therein from the drum.

16. A method according to claim 1 5 for debranning grain, wherein the grain particles comprise bran.

17. A method according to claim 16 further comprising removing hulled grain from adjacent an outlet end of the drum.

18. A method according to claim 15 for milling grain, wherein the grain particles comprise flour.

19. A method according to claim 15 including admitting an inlet flow of air into the drum along the bottom of the drum, and cooling the inlet flow of air before it enters the drum.

20. A method according to claim 15 comprising screening the air drawn from the drum to remove bran therefrom.

21. A grain processor comprising:

a substantially cylindrical drum oriented substantially horizontally and having an inlet end;

a rotor having a rotor axis extending substantially horizontally along the interior of the drum, said rotor comprising a plurality of impellers projecting radially from the rotor axis, the impellers being spaced around and spaced along the rotor axis;

rotor drive means for rotating the rotor in the drum about the rotor axis;

grain inlet means for delivering grain to the drum adjacent the inlet end;

air inlet means separate from the grain inlet means for admitting air into the drum;

discharge means, including a discharge opening in the drum at a top side thereof; and vacuum means for applying a vacuum pressure to the discharge opening thereby drawing a flow of air into the air inlet means and through the drum to suspend solids suspended in the flow of air drawn from the drum, through the discharge opening.

22. A grain processor according to claim 21 wherein the air inlet means comprise a plurality of holes opening into the bottom of the drum, the holes being distributed along the drum.

23. A grain processor according to claim 21 wherein the grain inlet means include means for inhibiting a flow of air into the drum through the grain inlet means.

24. A processor according to claim 21 wherein the processor is a debranning mill for removing bran from grain, and including grain outlet means separate from the discharge opening and adjacent an outlet end of the drum opposite the inlet end for the removal of hulled grain from the drum.

25. A processor according to claim 21 wherein the processor is a debranning and milling apparatus wherein the solids suspended in the flow of air drawn from the drum include bran and milled grain, the processor including a separator for separating bran from the flow of air and solids suspended therein drawn through the discharge means.

26. A processor according to claim 21 wherein the grain inlet means comprises means for delivering grain into the bottom of the drum in a direction towards the inlet end of the drum.

27. A processor according to claim 21 wherein the grain inlet means delivers grain into the bottom of the drum at least partially in the direction of the rotation of the impeller elements.

28. A processor according to claim 21 wherein the air inlet means includes venturi means for accelerating air flow into the drum.

29. A processor according to claim 21 wherein the air inlet means includes valve means for restricting air flow into the drum.

30. A processor according to claim 21 wherein the vacuum means comprise a plenum at the top of the drum and a vacuum tube leading from the plenum.

* * * * *